United States Patent
Rogers

(10) Patent No.: US 8,065,888 B2
(45) Date of Patent: Nov. 29, 2011

(54) LOW TEMPERATURE MAINTAINING APPARATUS FOR FOOD ITEM

(76) Inventor: Bonnie Rogers, Las Vegas, NV (US)

(*) Notice: Subject to any disclaimer, the term of this patent is extended or adjusted under 35 U.S.C. 154(b) by 30 days.

(21) Appl. No.: 12/540,025

(22) Filed: Aug. 12, 2009

(65) Prior Publication Data

US 2010/0058797 A1    Mar. 11, 2010

Related U.S. Application Data

(63) Continuation of application No. 12/455,348, filed on Jun. 2, 2009, now abandoned.

(60) Provisional application No. 61/191,224, filed on Sep. 8, 2008.

(51) Int. Cl.
F25D 3/08    (2006.01)

(52) U.S. Cl. ............................ 62/457.6; 62/457.1

(58) Field of Classification Search ............... 62/457.1, 62/457.6, 457.7, 457.9, 459, 372
See application file for complete search history.

(56) References Cited

U.S. PATENT DOCUMENTS

| | | | | |
|---|---|---|---|---|
| 2,810,226 A * | 10/1957 | Horwitt | | 40/740 |
| 4,830,190 A * | 5/1989 | Inagaki | | 206/550 |
| 5,168,718 A * | 12/1992 | Bergmann | | 62/244 |
| 6,269,651 B1 * | 8/2001 | Price | | 62/255 |
| 6,378,325 B1 | 4/2002 | Yang | | |
| 6,840,396 B2 * | 1/2005 | Wuestman | | 220/592.28 |
| 7,290,677 B2 | 11/2007 | Wuestman | | |

* cited by examiner

*Primary Examiner* — Melvin Jones
(74) *Attorney, Agent, or Firm* — L.C. Begin & Associates, PLLC.

(57) ABSTRACT

An apparatus for maintaining low temperature of a food item includes a first bowl member, a second bowl member, and a lid member. The first bowl member includes a first body portion, a first open top end portion, and a first closed bottom end portion. The first bowl member is capable of receiving a cooling material therewithin. Further, the second bowl member includes a second body portion, a second open top end portion, and a second closed bottom end portion. The second bowl member is capable of receiving the food item therewithin. The second bowl member is configured to be removably received within the first bowl member. The second bowl member includes at least one handle member for facilitating lifting and carrying of the second bowl member. The lid member covers the food item received in the second bowl member.

16 Claims, 2 Drawing Sheets

LOW TEMPERATURE MAINTAINING APPARATUS FOR FOOD ITEM

CROSS-REFERENCE TO RELATED APPLICATIONS

This application is continuation application of U.S. application Ser. No. 12/455,348 filed on Jun. 2, 2009 now abandoned which claims priority under 35 United States Code, Section 119 on the U.S. Provisional Patent Application No. 61/191,224 filed on Sep. 8, 2008, the disclosure of which is incorporated by reference.

FIELD OF THE DISCLOSURE

The present disclosure generally relates to low temperature maintaining apparatuses, and more particularly, to a low temperature maintaining apparatus that is capable of maintaining low temperature of a food item such as a salad stored therewithin.

BACKGROUND OF THE DISCLOSURE

Perishable food items such as fruits, vegetables, and the like (hereinafter referred as food items) require low temperatures for maintaining freshness thereof for extended periods of time. Food items such as salads and vegetables tend to wilt upon being stored in conventional vessels. Also, keeping fruits and vegetables at room temperature for extended periods in a kitchen may result in spoilage thereof. Accordingly, a cooling unit, such as a refrigerator, is used for maintaining low temperatures while storing the food items.

However, while going out for recreational activities such as picnics, it may be difficult to carry a cooling unit to store the food items. Often, the food items remain outside the cooling unit for an extended period of time, which causes bacteria to grow in the food items. The bacteria may cause food poisoning, if the contaminated food is ingested. Specifically, food items prepared with mayonnaise and other dairy products begin to spoil faster as compared to vegetables and fruits, if not refrigerated.

During recreational activities such as get-togethers and potluck dinners, food items may be stored in a cooling unit such as a refrigerator, and taken out of the cooling unit while serving the meal. However, it may be inconvenient for an individual to carry the food items from the table to the cooling unit time and again, during meals. Further, the food items may need to be transferred into a serving dish after being taken out of the cooling unit. The transferring of the food items to the serving dish every time the food items are taken out of the cooling unit may become cumbersome for the individual.

Conventionally, when salads and vegetables are taken out of the refrigerator, ice cubes are placed directly over the salads and the vegetables for keeping the salads and the vegetables cool and fresh temporarily. However, eventually, the ice cubes may melt down and become mixed with the vegetables and the salads. Moreover, upon soaking in melted ice water for an extended period, the food items may become oversaturated, rotten, and otherwise unfit for consumption.

Accordingly, there exists a need for a low temperature maintaining apparatus that is capable of preventing growth of bacteria in a food item, such as a fruit, a salad, a vegetable, and the like, stored therewithin. Further, there exists a need for a low temperature maintaining apparatus that is capable of being used as a serving dish for serving a food item such as a fruit, a salad, a vegetable, and the like, stored therewithin.

Furthermore, there exists a need for a low temperature maintaining apparatus that is capable of being conveniently carried by a user while indulging in recreational activities such as a picnic, a potluck dinner, and the like.

SUMMARY OF THE DISCLOSURE

In view of the foregoing disadvantages inherent in the prior art, the general purpose of the present disclosure is to provide a low temperature maintaining apparatus, configured to include all the advantages of the prior art, and to overcome the drawbacks inherent therein.

Therefore, an object of the present disclosure is to provide a low temperature maintaining apparatus that is capable of preventing growth of bacteria in a food item such as a fruit, a salad, a vegetable, and the like, stored therewithin.

Another object of the present disclosure is to provide a low temperature maintaining apparatus that is capable of being used as a serving dish for serving a food item such as a fruit, a salad, a vegetable, and the like, stored therewithin.

Yet another object of the present disclosure is to provide a low temperature maintaining apparatus that is capable of being conveniently carried by a user while indulging in recreational activities such as a picnic, a potluck dinner, and the like.

To achieve the above objects, in an aspect of the present disclosure, an apparatus for maintaining a low temperature of a food item is provided. The apparatus includes a first bowl member, a second bowl member, and a lid member. The first bowl member includes a first body portion, a first open top end portion, and a first closed bottom end portion. The first bowl member is capable of receiving a cooling material therewithin. Further, the second bowl member includes a second body portion, a second open top end portion, and a second closed bottom end portion. The second bowl member is capable of receiving a food item therewithin. The second bowl member is configured to be removably received within the first bowl member for snugly fitting the second open top end portion of the second bowl member with the first open top end portion of the first bowl member. The second bowl member includes at least one handle member configured on the second open top end portion thereof. The at least one handle member facilitates lifting and carrying of the second bowl member. The lid member is configured to be removably received on the second open top end portion of the second bowl member. The lid member thereby covers the food item received in the second bowl member. Upon the second bowl member being received within the first bowl member, the cooling material comes in contact with the second body portion of the second bowl member. The cooling material thereby maintains a low temperature of the food item received within the second bowl member.

In another aspect of the present disclosure, the apparatus for maintaining low temperature of the food item includes an insulation liner disposed on an inner surface of the first body portion of the first bowl member. The insulation liner is capable of reducing a rate of warming of the cooling material.

The apparatus for maintaining low temperature of the food item as disclosed herein is capable of preventing growth of bacteria in the food item as the insulation liner disposed on the inner surface of the first body portion of the first bowl member reduces the rate of warming of the cooling material. The apparatus for maintaining low temperature of the food item is further capable of being used as a serving dish for serving food items such as fruits, salads, and the like stored therewithin.

These together with other aspects of the present disclosure, along with the various features of novelty that characterize the present disclosure, are pointed out with particularity in the claims annexed hereto and form a part of this present disclosure. For a better understanding of the present disclosure, its operating advantages, and the specific objects attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

The exemplary embodiments described herein in detail for illustrative purposes are subject to many variations in structure and design. It should be emphasized, however, that the present disclosure is not limited to a particular apparatus for maintaining low temperature of food item, as shown and described. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting. The use of terms, "including," or "comprising," and variations thereof herein is meant to encompass the items listed thereafter and equivalents thereof as well as additional items.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The term, "top," "bottom," "side," and the like, herein do not denote any order, elevation or importance, but rather are used to distinguish placement of one element over another.

The present disclosure relates to an apparatus for maintaining a low temperature (hereinafter referred to as low temperature maintaining apparatus) of a food item. The term "food item" relates to perishable food products including, but not limited to a fruit, a salad, a vegetable, a dairy product and combinations thereof. The low temperature maintaining apparatus facilitates in keeping the food item cool and fresh for an extended period. Further, the low temperature maintaining apparatus may be conveniently carried by a user while indulging in recreational activities such as a picnic, a potluck dinner, and the like. The low temperature maintaining apparatus of the present disclosure is explained in conjunction with FIGS. 1 and 2.

Figure 1:
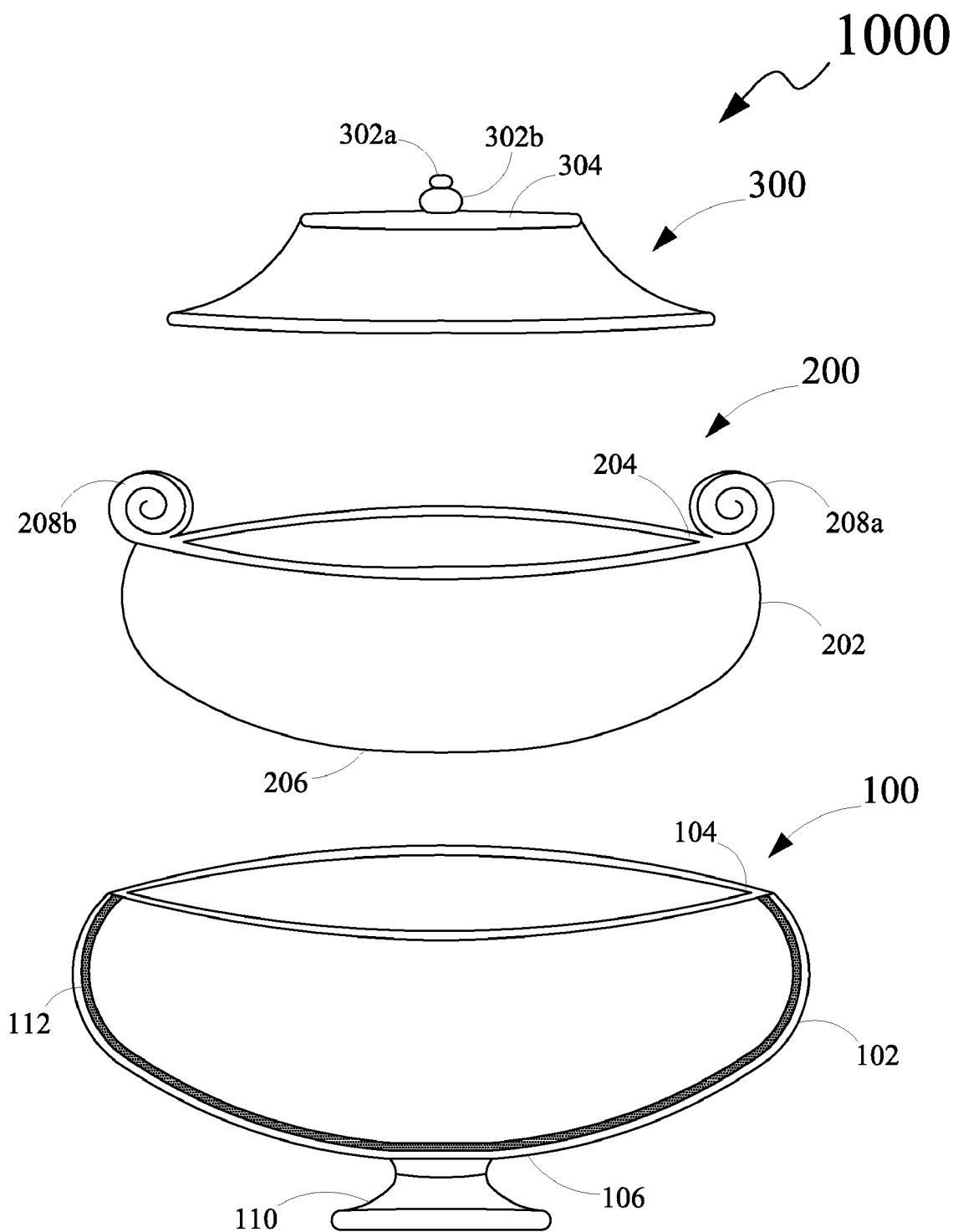
FIG. 1 depicts an exploded view of an apparatus for maintaining low temperature of a food item, in accordance with an embodiment of the present disclosure.

FIG. 1 depicts an exploded view of a low temperature maintaining apparatus 1000, in accordance with an embodiment of the present disclosure. Further, FIG. 2 depicts an assembled front perspective view of the low temperature maintaining apparatus 1000, in accordance with an embodiment of the present disclosure.

The low temperature maintaining apparatus 1000 includes a first bowl member 100, a second bowl member 200, and a lid member 300. The first bowl member 100 includes a first body portion 102, a first open top end portion 104, and a first closed bottom end portion 106. The first body portion 102, the first open top end portion 104, and the first closed bottom end portion 106 configure collectively a space for receiving a cooling material, such as a cooling material 108 (shown in FIG. 2) within the first bowl member 100. For the purpose of this description, the cooling material 108 received within the first bowl member 100 is ice.

Figure 2:
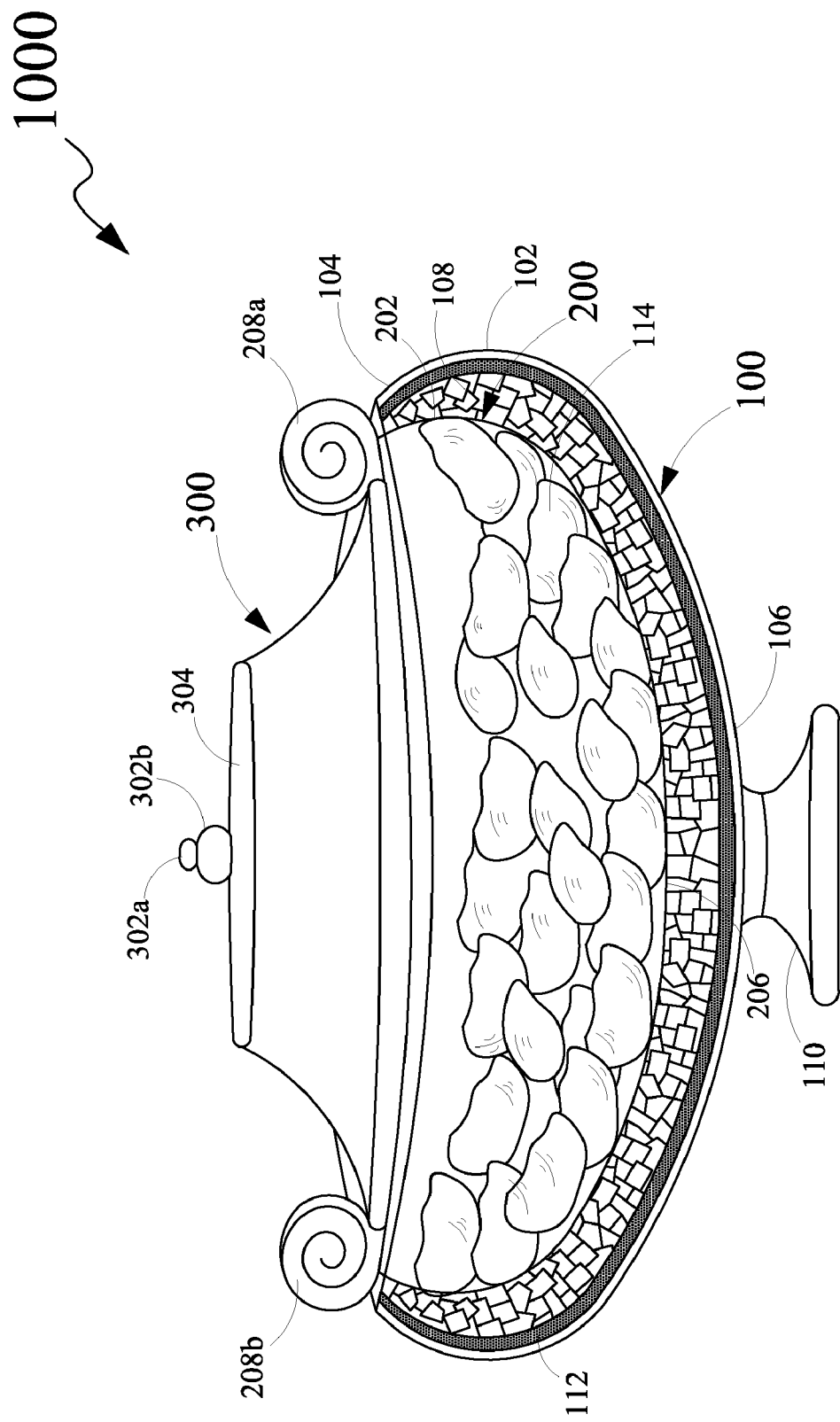
FIG. 2 depicts an assembled front perspective view of the apparatus of FIG. 1, in accordance with an embodiment of the present disclosure.

In an embodiment of the present disclosure, the first bowl member 100 includes a pedestal portion 110 extending away from the first closed bottom end portion 106 of the first bowl member 100 (as depicted in FIGS. 1 and 2). The pedestal portion 110 of the first bowl member 100 is capable of supporting the first bowl member 100.

Further, the first bowl member 100 includes an insulation liner 112 disposed at an inner surface (not shown) of the first body portion 102 of the first bowl member 100 (as depicted in FIGS. 1 and 2). The insulation liner 112 reduces transmission of heat from surroundings to an inside of the first bowl member 100, thereby reducing a rate of warming of the cooling material 108 and maintains low temperature of a food item 114 (shown in FIG. 2) for an extended period. In an embodiment of the present disclosure, the first bowl member 100 is composed of a plastic material such as, but not limited to, polyethylene terephthalate (PET), polyvinyl chloride (PVC).

The second bowl member 200 includes a second body portion 202, a second open top end portion 204, and a second closed bottom end portion 206. The second body portion 202, the second open top end portion 204, and the second closed bottom end portion 206 collectively configure a space for receiving the food item 114 (as depicted in FIG. 2) therewithin. Specifically, the second bowl member 200 is capable of receiving a perishable food item such as a fruit, a salad, a vegetable, a diary product, and the like (hereinafter referred as food item), therewithin. However, it will be evident to a person skilled in the art that the second bowl member 200 is also capable of receiving non-perishable food items such as cereals, nuts, and the like.

The second bowl member 200 is configured to be removably received within the first bowl member 100 such that the second open top end portion 204 of the second bowl member 200 snugly fits with the first open top end portion 104 of the first bowl member 100. In the present embodiment, the first bowl member 100 and the second bowl member 200 are shown to assume a concave shape. However, it will be evident to a person skilled in the art that the first bowl member 100 and the second bowl member 200 may be configured in any other shape known in the art.

Upon the second bowl member 200 being received within the first bowl member 100, the cooling material 108 comes in contact with the second body portion 202 of the second bowl member 200 (as depicted in FIG. 2). Due to contact of the second body portion 202 with the cooling material 108, the food item 114 received within the second bowl member 200 remains cool for extended period. Moreover, as explained earlier, the insulation liner 112 of the first bowl member 100 facilitates maintaining the food item 114 at a lower temperature for extended period, thereby preventing growth of bacteria, such as a salmonella bacteria and the like, in the food item 114. In an embodiment of the present disclosure, the second bowl member 200 is composed of a plastic material such as, but not limited to, PET and PVC.

The low temperature maintaining apparatus 1000 further includes at least one handle member such as a handle member 208a and a handle member 208b (hereinafter collectively referred to as the handle members 208) configured on the second open top end portion 204 of the second bowl member 200. The handle members 208 facilitate lifting and carrying of the second bowl member 200 while placing the second bowl member 200 within and removing it from the first bowl member 100. In the present embodiment, the at least one handle member includes a pair of handles configured opposite to one another for facilitating lifting and carrying of the second bowl member 200. However, it will be evident to a person skilled in the art that in an alternative embodiment, the at least one handle member may include only one handle member for lifting and carrying the second bowl member 200. Further, for the purpose of this description, the handle members 208 are configured to assume a curved shape. Specifically, each of the handle members 208 are bent towards the center of the second open top end portion 204 of the second bowl member 200 to enhance an aesthetic appearance of the second bowl member 200 (as depicted in FIGS. 1 and 2). However, it will be evident to a person skilled in the art that the handle members 208 may be configured to assume any shape known in the art. In an embodiment of the present disclosure, the handle members 208 are composed of a plastic material such as, but not limited to, PET and PVC.

Further, the lid member 300 is removably received on the second open top end portion 204 of the second bowl member 200. The lid member 300 is capable of covering the food item 114 received in the second bowl member 200. For the purpose of this description, the lid member 300 is configured to assume a curved shape. However, it may be evident to a person skilled in the art that the lid member 300 may be configured to have any other shape based on the shape of the second bowl member 200 to completely cover the second open top end portion 204 of the second bowl member 200. In an embodiment of the present disclosure, the lid member 300 is composed of a plastic material such as, but not limited to, PET and PVC.

In the present embodiment, the lid member 300 includes a first ball member such as a first ball member 302a, and a second ball member such as a second ball member 302b (hereinafter referred to as the pair of ball members 302) configured at a top portion 304 of the lid member 300. The pair of ball members 302 facilitates lifting and carrying of the lid member 300 by a user for accessing the food item 114 stored within the second bowl member 200. It will also be evident to a person skilled in the art that the pair of ball members 302 may be replaced by any lifting and carrying means known in the art, such as a handle, that facilitates the lifting and carrying of the lid member 300.

In use, a user may place the cooling material 108 in the first bowl member 100. Further, the user may place the second bowl member 200 containing perishable food item such as a fruit, a salad, a vegetable, a dairy product, and the like, within the first bowl member 100 such that the second body portion 202 of the second bowl member 200 comes in contact with the cooling material 108 such as ice. Specifically, the second open top end portion 204 of the second bowl member 200 snugly fits with the first open top end portion 104 of the first bowl member 100. Thereafter, the user may cover the second bowl member 200 using the lid member 300. It will be evident to a person skilled in the art that the first bowl member 100 and the second bowl member 200 may be used separately for storing and serving the non-perishable food item.

The disclosed low temperature maintaining apparatus such as the low temperature maintaining apparatus 1000 may be fabricated in a variety of sizes depending on an application area for usage thereof. In the present embodiment, the first bowl member 100 and the second bowl member 200 are circular in shape. Further, the first bowl member 100 may have a diameter of about eleven to sixteen inches and the second bowl member 200 may have a diameter of about eight inches. However, it will be evident to a person skilled in the art that any size of the low temperature maintaining apparatus may be produced in any shape known in the art based on user's preferences and application area thereof. Further, the exact dimensions and materials for the construction and operation of the low temperature maintaining apparatus may vary.

As disclosed herein, the present disclosure provides a low temperature maintaining apparatus that is capable of being used as a serving dish for serving a food item. The low temperature maintaining apparatus prevents growth of bacteria in the food item by maintaining low temperature of the food item for extended period. Moreover, the low temperature maintaining apparatus may be composed of a light blue semi-transparent plastic material. The light blue semi-transparent plastic material enhances the aesthetic appearance of the low temperature maintaining apparatus. Further, the low temperature maintaining apparatus may be conveniently carried by a user while indulging in activities such as a picnic, a potluck dinner, and the like.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the claims of the present disclosure.

What is claimed is:

1. An apparatus for maintaining low temperature of a food item, the apparatus comprising:
   a first bowl member having a first body portion, a first open top end portion, an inner surface, and a first closed bottom end portion, the first bowl member capable of receiving a cooling material therewithin;
   an insulation liner disposed on said inner surface of the first body portion of the first bowl member; and
   a second bowl member having a second body portion, a second open top end portion, and a second closed bottom end portion, the second bowl member capable of receiving the food item therewithin, the second bowl member configured to be removably received within the first bowl member for fitting the second open top end portion of the second bowl member within the first open top end portion of the first bowl member.

2. The apparatus of claim 1, wherein the first bowl member further comprises a pedestal portion extending away from the first closed bottom end portion of the first bowl member, wherein the pedestal portion is capable of supporting the first bowl member.

3. The apparatus of claim 1, wherein the cooling material is ice.

4. The apparatus of claim 1, wherein the first bowl member is composed of aplastic material.

5. The apparatus of claim 1, wherein the second bowl member is composed of a plastic material.

6. The apparatus of claim 1, wherein the lid member is composed of a plastic material.

7. The apparatus of claim 1, wherein the apparatus is made from plastic material.

8. An apparatus for maintaining a food item, the apparatus comprising:
 a first plastic bowl member having a first body portion, a first open top end portion, and a first closed bottom end portion, the first plastic bowl member capable of receiving a cooling material therewithin; and
 a second plastic bowl member having a second body portion, a second open top end portion, and a second closed bottom end portion, the second plastic bowl member capable of receiving the food item therewithin, the second plastic bowl member configured to be removably received within the first plastic bowl member for fitting the second open top end portion of the second plastic bowl member within the first open top end portion of the first plastic bowl member.

9. The apparatus of claim 8, wherein the first plastic bowl member comprises an insulation liner disposed on an inner surface of the first body portion of the first plastic bowl member.

10. The apparatus of claim 8, wherein the apparatus is made from a plastic selected from polyethylene terephthalate and polyvinylchloride.

11. An apparatus for maintaining a food item, the apparatus comprising:
 a first plastic bowl member having a first body portion, an inner surface, a first open top end portion, and a first closed bottom end portion, the first bowl member capable of receiving a cooling material therewithin;
 an insulation liner disposed on said inner surface of the first body portion of the first plastic bowl member; and
 a second plastic bowl member having a second body portion, a second open top end portion, and a second closed bottom end portion, the second bowl member capable of receiving the food item therewithin, the second plastic bowl member configured to be removably received within the first plastic bowl member for fitting the second open top end portion of the second plastic bowl member within the first open top end portion of the first plastic bowl member.

12. The apparatus of claim 11, wherein the apparatus is made from a plastic selected from polyethylene terephthalate and polyvinylchloride.

13. The apparatus of claim 1 further comprising a lid member configured to be removably received on the second open top end portion of the second bowl member.

14. The apparatus of claim 8 further comprising a plastic lid member configured to be removably received on the second open top end portion of the second plastic bowl member.

15. The apparatus of claim 11 further comprising a plastic lid member configured to be removably received on the second open top end portion of the second plastic bowl member.

16. The apparatus of claim 8, wherein the apparatus is made from a plastic selected from polyethylene terephthalate and polyvinylchloride.

* * * * *

UNITED STATES PATENT AND TRADEMARK OFFICE
CERTIFICATE OF CORRECTION

| | | |
|---|---|---|
| PATENT NO. | : 8,065,888 B2 | Page 1 of 1 |
| APPLICATION NO. | : 12/540025 | |
| DATED | : November 29, 2011 | |
| INVENTOR(S) | : Rogers | |

It is certified that error appears in the above-identified patent and that said Letters Patent is hereby corrected as shown below:

Column 7, Claim 4, Line 7; Delete "aplastic" and insert --a plastic--

Signed and Sealed this
Thirty-first Day of January, 2012

David J. Kappos
*Director of the United States Patent and Trademark Office*